US006740377B2

(12) United States Patent
Pecorini et al.

(10) Patent No.: US 6,740,377 B2
(45) Date of Patent: May 25, 2004

(54) POLYESTER HAVING IMPROVED CRYSTALLIZATION BEHAVIOR AND EXTRUSION BLOW MOLDED ARTICLES MADE THEREFROM

(75) Inventors: Thomas Joseph Pecorini, Kingsport, TN (US); Harold Eugene Dobbs, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/242,569

(22) Filed: Sep. 12, 2002

(65) Prior Publication Data

US 2003/0055205 A1 Mar. 20, 2003

Related U.S. Application Data

(60) Provisional application No. 60/322,073, filed on Sep. 14, 2001.

(51) Int. Cl.$^7$ .......................... B29D 22/00; C08G 63/00
(52) U.S. Cl. .................... 428/35.7; 528/298; 528/301; 528/302; 528/307; 528/308; 528/308.6; 528/503; 428/34.1
(58) Field of Search ................. 528/298, 301, 528/302, 307, 308, 308.6, 503; 428/34.1, 35.7

(56) References Cited

U.S. PATENT DOCUMENTS

| | | |
|---|---|---|
| 2,901,466 A | 8/1959 | Kibler et al. |
| 3,117,950 A | 1/1964 | Kibler et al. |
| 4,064,112 A | 12/1977 | Rothe et al. |
| 4,161,579 A | 7/1979 | Edelman et al. |
| 4,182,841 A | 1/1980 | Hauenstein |
| 4,219,527 A | 8/1980 | Edelman et al. |
| 4,234,708 A | 11/1980 | Edelman et al. |
| 4,256,861 A | 3/1981 | Davis et al. |
| 4,398,022 A | 8/1983 | Sublett |
| 4,539,390 A | 9/1985 | Jackson, Jr. et al. |
| 4,554,329 A | 11/1985 | Sinker et al. |
| 4,983,711 A | 1/1991 | Sublett et al. |
| 5,194,573 A | 3/1993 | Schmidt et al. |
| 5,235,027 A | 8/1993 | Thiele et al. |
| 5,250,333 A | 10/1993 | McNeely et al. |
| 5,376,735 A | 12/1994 | Sublett |
| 5,442,036 A | 8/1995 | Beavers et al. |
| 5,523,382 A | 6/1996 | Beavers et al. |
| 5,633,340 A | * 5/1997 | Hoffman et al. ............ 528/272 |
| 5,804,617 A | 9/1998 | Hoffman et al. |
| 5,989,663 A | 11/1999 | Morris et al. |
| 6,096,854 A | 8/2000 | Morris et al. |

* cited by examiner

Primary Examiner—Samuel A. Acquah
(74) Attorney, Agent, or Firm—Bernard J. Graves, Jr.; B. J. Boshears

(57) ABSTRACT

A PCT copolyester composition having at least about 70 mole % terephthalic acid and at least about 70 mole % 1,4-cyclohexanedimethanol and an inherent viscosity of greater than about 0.9 dL/g is prepared by solid state polymerizing a copolyester composition having a starting inherent viscosity of from about 0.4 to about 0.8 dL/g for a period of from about 1 minute to 100 hours and at a temperature of from about 140° C. to about 2° C. below the melting point of the copolyester to produce a copolyester having an inherent viscosity of greater than about 0.9 dL/g. Another aspect of the present invention is an extrusion blow molded article made from the copolyester prepared by the solid state polymerization process.

19 Claims, No Drawings

POLYESTER HAVING IMPROVED CRYSTALLIZATION BEHAVIOR AND EXTRUSION BLOW MOLDED ARTICLES MADE THEREFROM

CROSS REFERENCE TO RELATED APPLICATIONS

Benefit is claimed to the earlier filed application having U.S. Ser. No. 60/322,073 filed Sep. 14, 2001, the entire disclosure of which is incorporated herein by reference.

BACKGROUND OF THE INVENTION

1. Field of the Invention

This invention relates to polyester compositions, and particularly to poly(cyclohexylenedimethylene terephthalate) (PCT) copolyester formulations having improved crystallization behavior and articles made therefrom exhibiting improved shatter resistance. More particularly, the invention relates to PCT copolyester formulations prepared by the process of solid state polymerization and have greater than 70 mole % 1,4-cyclohexanedimethanol, a crystallization halftime, as defined herein, of between 2 minutes and 10 minutes, and an inherent viscosity of greater than 0.90 dL/g, and to extrusion blow molded articles made from the PCT copolyester formulations. Surprisingly, these articles have improved shatter resistance over articles made from poly(ethyleneterephthalate) (PET) and copolyesters containing terephthalic acid, ethylene glycol and less than about 40 mole % 1,4-cyclohexanedimethanol (CHDM).

2. Background of the Invention

Extrusion blow molding is a common process for creating hollow articles from polymeric materials. A typical extrusion blow-molding manufacturing process involves: 1) melting the resin in an extruder; 2) extruding the molten resin through a die to form a parison having a uniform wall thickness; 3) clamping a mold having the desired finished shape around the parison; 4) blowing air into the parison, causing the extrudate to stretch and expand to fill the mold; 5) cooling the molded article; and 6) ejecting the article from the mold.

The hollow articles generated by extrusion blow molding are often used to contain solid or liquid products. The container must, therefore, be sufficiently tough to protect the product and prevent it from leaking or spilling after an accidental drop or impact. Toughness of the blow molded article is related to several factors, including part design, wall thickness, size of the container, and material. For filled articles, size of the container affects toughness greatly, as the weight of the contents produces the impact weight. Larger containers will hold heavier masses that will produce a higher impact load. In order to compensate for these higher impact loads, wall thickness must be increased or a tougher material must be selected. Unfortunately it is not always possible to increase wall thickness due to melt strength limitations and cost. Thus, the preferred solution is usually to extrusion blow mold the containers from a tougher material.

For many applications, such as non-carbonated beverage bottles and other containers, the polymer used in the extrusion blow molded articles also need to be amorphous so that the blow molded article will be transparent. This limits the number of polymers that can be utilized. Polyethylene terephthalate (PET) and copolymers based on PET are often used for extrusion blow-molding hollow, amorphous transparent articles.

Unfortunately, the low toughness of PET based polyesters and PET copolyesters containing up to 40% CHDM restricts container design and utility. It is possible to add impact modifiers to these materials, but the resultant blends are generally opaque. There are other clear extrusion blow moldable materials available, such as PVC and polycarbonate. However, these resins can have problems with chemical resistance, toughness, resin cost and environmental concerns. Thus, there is a need for a copolyester having greater toughness than PET and PET copolymers that can be extrusion blow molded into hollow, amorphous transparent articles.

It is known that injection molded articles made from copolyesters of terephthalic acid with ethylene glycol and greater than 50 mole % 1,4-cyclohexanedimethanol, such as those described in U.S. Pat. No. 2,901,466, show improved toughness over injection molded articles made from PET and PET copolymers. Typically, these copolyesters have inherent viscosities (I.V.) less than 0.90 dL/g, and require high melt processing temperatures and fast quenching to avoid crystallization related problems. This combination of low I.V. and high melt temperature processing leads to a low melt strength in the polyester or copolyester. Additionally, articles that crystallize during the extrusion blow molding process are either totally or partially white. Such white or hazy parts are unacceptable in applications where clarity and transparency are required.

In order to form good quality containers that have uniform side wall thickness and to prevent tearing (blow-out) of the parison during expansion, the polymer extrudate must have good molten dimensional stability. Dimensional stability is related to the polymer's melt strength. Generally, melt strength has been determined in accordance with ASTM D3835 by extruding the molten polymer downward through a die 0.1 inch (0.254 cm) in diameter and 0.25 inch (0.635 cm) long at a shear rate of 20 seconds$^{-1}$ using an Instron rheometer and allowing the extrudate to fall freely. A material having high melt strength has a tendency to resist stretching and flowing as a result of gravitational force when in the softened or molten state. Shorter flow lengths indicate better melt strength and, consequently, less sag of the parison. Thus, materials with high melt strength perform better in the extrusion blow molding process.

The melt strength of a polymer is directly related to its melt viscosity measured at 1 radian/second on a rotary melt rheometer. Polymers that have melt strengths high enough to be extrusion blow molded typically have melt viscosities of greater than 30,000 poise measured at 1 rad/sec and at the melt temperature of a typical parison.

Because of the high viscosity requirements particular to extrusion blow molding, special grades of PET and PET copolymers must be used. The inherent viscosity of a PET based polyester does not exceed 0.90 dL/g when made in a typical commercial melt phase polymerization reactor. In order to obtain the high melt viscosities required for the extrusion blow molding process, a PET based polyester with an inherent viscosity of less than 0.90 dL/g must be processed at a relatively cold temperature. For example, a melt phase PET copolyester having terephthalic acid with ethylene glycol and containing between 20 and 50 mole % 1,4-cyclohexanedimethanol as a modifying diol needs to be extrusion blow molded at a parison melt temperature of between 210° C. and 230° C. Fortunately, this copolyester has a low melting temperature and very slow crystallization halftime.

In contrast, if PET composed substantially of terephthalic acid and ethylene glycol or PET with low levels, i.e., less than about 10 mole % and preferably less than about 5 mole % of a secondary comonomer such as a diacid, a diol or combinations thereof, is processed at this low a temperature, it can crystallize in the feed section or barrel of the extruder, or in the parison. Crystallization in the extruder can halt the process or lead to imperfections in the final article. Crystallization in the parison can lead to undesirable opacity or embrittlement of the final article, or will lead to a parison that can not be blown into the desired final shape. Thus, other methods must be used to raise the melt viscosity of crystallizable polyesters so that they can be processed at temperatures above their melt temperature. One method is to add a branching agent to the composition. Another method is to raise the molecular weight through solid state polymerization, referred to herein as solid state or stating polymerization processing.

The solid state polymerization process is well known. Typically, amorphous precursor pellets that have been prepared by melt phase polymerization are first crystallized at a temperature 10°–100° C. below their melt temperature and then moved to a second stage where they are held at a temperature at least 10° C. below their melt temperature for a sufficiently long time (2–40 hours) in a vacuum to increase the inherent viscosity of the polymer.

One unique problem with polyesters and copolyesters is that they must be both solid state polymerization processed and thereafter extrusion blow molded into amorphous articles is that the precursor polyester pellets must crystallize quickly enough so that they can be crystallized in the solid stating process, but not crystallize so rapidly as to crystallize during the extrusion blow molding process. Accordingly, there is a limited range of compositions that will meet this criteria.

U.S. Pat. No. 3,117,950 discloses the use of the solid stating polymerization process to increase the inherent viscosity of PCT based polymers from an I.V. of less than 0.57 to a greater I.V. This patent does not disclose the specific compositions disclosed herein nor the use of these solid stated polymers for extrusion blow molding to produce transparent extrusion blow molded products.

U.S. Pat. No. 4,983,711 discloses copolyesters of terephthalic acid with 25 to 75 mole % ethylene glycol and 75 to 25 mole % CHDM that contain a branching agent. These compositions are useful for extrusion blow molding. However, this patent does not disclose the use of solid state polymerization to obtain high molecular weight copolyesters suitable for extrusion blow molding applications.

SUMMARY OF THE INVENTION

Briefly, the present invention is a copolyester composition having at least about 70 mole % terephthalic acid and least about 70 mole % 1,4-cyclohexanedimethanol wherein the mole percentages of the acid component total 100 mole % and the mole percentages of the glycol component total 100 mole %; and having an inherent viscosity greater than 0.9 dL/g as determined in a 60/40 (wt./wt.) phenol/tetrachloroethane at a concentration of 0.5 g/100 ml as determined at 25° C. The copolyester composition is prepared by solid state polymerizing a copolyester composition having a starting inherent viscosity of from about 0.4 to about 0.8 dL/g for about 1 minute to about 100 hours and at a temperature of from about 140° C. to about 2° C. below the melting point of the polyester so that the inherent viscosity is increased to greater than 0.9 dL/g. After solid state polymerization, the copolyester of the present invention has a crystallization halftime of between 2 minutes and 10 minutes, when measured by from the glass state by a DSC halftime technique at a temperature of 170° C. The copolyester typically has a melt temperature of from about 240° to about 270° C. when measured by a DSC scan rate technique.

Another aspect of the present invention is for a blow molded article, such as food containers, personal care containers, medical devices and containers, industrial containers, as well as blow molded parts for appliances, cabinetry and automotive applications made from the solid state polymerized copolyester. The copolyester produces a amorphous extrusion blow molded article that is tougher, i.e., better impact resistance, than an article made from PET or PET based copolyesters having less than 70 mole % 1,4-cyclohexanedimethanol (PETG).

DETAILED DESCRIPTION OF THE INVENTION

The extrusion blow molded articles made from the compositions described in greater detail herein are amorphous and are tougher than articles made from PET or PETG. The copolyester of the invention typically contains residue moieties of a diacid and a diol wherein the mole percentages expressed herein are based on 100 mole percent of the diacid and 100 mole percent of the diol. In accordance with the present invention, the copolyester contains at least about 70 mole % terephthalic acid as the acid moiety and at least about 70 mole % 1,4-cyclohexanedimethanol as the diol moiety and is solid state polymerized to an inherent viscosity of greater than about 0.90 dL/g, and preferably to an inherent viscosity of from about 0.95 to about 1.10 dL/g after solid stating. The copolyester has a melt temperature of from about 240° to about 270° C. when measured by a DSC heating scan rate technique. The inherent viscosities of the copolyesters of this invention are determined in a 60/40 (wt./wt.) phenol/tetrachloroethane at a concentration of 0.5 g/100 ml as determined at 25° C. The acid component of the copolyesters comprises at least about 70 mole % terephthalic acid. Desirably, the acid moiety may contain repeat units of from 0 to about 30 mole % of a secondary acid selected from the group of dibasic acids of terephthalic acid, isophthalic acid, cyclohexanedicarboxylic acid, naphthalenedicarboxylic acid, diphenyldicarboxylic acid, stilbenedicarboxylic acid and mixtures thereof. When using the cyclohexanedicarboxylic acids, they may be in the cis or trans forms or as cis/trans isomer mixtures. When cyclohexanedicarboxylic acid is used, 1,3- and 1,4-cyclohexanedicarboxylic acid are preferred. When naphthalenedicarboxylic acid is used, 2,6-, 2,7-, 1,4- and 1,5-naphthalenedicarboxylic acid are preferred. Other acids include aliphatic dicarboxylic acids and cycloaliphatic dicarboxylic acids, each preferably having 4 to 40 carbon atoms, such as phthalic acid, cyclohexanediacetic acid, succinic acid, glutaric acid, adipic acid, azelaic acid, sebacic acid and mixtures thereof. The mole percentages of the acid component of the copolyesters of the invention equal a total of 100 mole %.

The copolyesters also comprise at least 70 mole % of 1,4-cyclohexanedimethanol. The cyclohexanedimethanol may be in the cis or trans forms or as cis/trans isomer mixtures. Desirably, the diol moiety may contain repeat units of from 0 to about 30 mole % of a secondary diol selected from aliphatic or alicyclic glycols, preferably containing 2 to 20 carbon atoms. These remaining or secondary diols may be selected from ethylene glycol, diethylene glycol, triethylene glycol, propanediol, butanediol, pentanediol, hexanediol, tetramethylcyclobutanediol, 1,4-cyclohexanedimethanol and mixtures thereof. The mole percentages of the glycol component of the copolyesters of the invention equal a total of 100 mole %.

In a preferred embodiment, the copolyesters have at least about 70 mole % terephthalic acid and from about 20 to about 30 mole % isophthalic acid and 100 mole % 1,4-cyclohexanedimethanol in a 70/30 cis/trans ratio.

In a second preferred embodiment, the copolyesters have 100 mole % terephthalic acid and from about 77 mole % to about 90 mole % 1,4-cyclohexanedimethanol in a 70/30 cis/trans ratio and from about 23 to about 10 mole % ethylene glycol and more preferably from about 15 mole % to about 20 mole % ethylene glycol and the remainder is 1,4-cyclohexanedimethanol.

The copolyesters of this invention are readily prepared using melt phase or solid state polycondensation procedures described in greater detail in U.S. Pat. Nos. 4,256,861, 4,539,390, and 2,901,466, the entire disclosures of which are incorporated herein by reference. The copolyester may be made by batch or continuous processes and include preparation by direct condensation or by ester interchange.

Briefly, a typical procedure consists of at least two distinct stages; the first stage, known as ester-interchange or esterification, is conducted under an inert atmosphere at a temperature of 150° C. to 250° C. for 0.5 to 8 hours, preferably from 180° C. to 240° C. for 1 to 4 hours. The glycols, depending on their reactivities and the specific experimental conditions employed, are commonly used in molar excesses of 1.05–2.5 per total moles of acid-functional monomers. The second stage, referred to as polycondensation, is conducted under reduced pressure at a temperature of 230° C. to 350° C., preferably 265° C. to 325° C., and more preferably 270° C. to 300° C. for 0.1 to 6 hours, and preferably 0.25 to 2 hours. Stirring or appropriate reaction conditions are used in both stages to ensure adequate heat transfer and surface renewal of the reaction mixture. The reactions of both stages are facilitated by appropriate catalysts, especially those well-known in the art, such as alkoxy titanium compounds, alkali metal hydroxides and alcoholates, salts of organic carboxylic acids, alkyl tin compounds, metal oxides, and combinations thereof.

The copolyester precursor particles are normally crystallized under forced motion at a temperature of about 100° C.–260° C. prior to being solid-state polymerized. In some processes, the crystallization and solid-state polymerization steps might not be distinct.

Solid-state polymerization is a process well known in the art. For example, U.S. Pat. No. 4,064,112, which is incorporated herein by reference, describes a typical solid-state process. In this process, amorphous precursor pellets that have been prepared by melt phase polymerization are first crystallized at a temperature 10°–100° C. below their melt temperature (crystallization phase) and then further held at a temperature of at least 10° C. below their melt temperature for a sufficiently long time, e.g., 2–40 hours, in the presence of either vacuum or dry nitrogen to increase their IV (solid stating phase). These high temperatures are required to allow polymerization to proceed at a relatively rapid and economical rate. At these high temperatures, amorphous pellets would soften and fuse together into a highly viscous block. In contrast, crystalline pellets will not stick together at these temperatures. Thus, solid state polymerization can only be performed on crystallized pellets. Copolyesters possessing crystallization halftimes, measured at 170° C., greater than 10 minutes will not fully crystallize in the crystallization phase and then will undesirably fuse together in the solid stating phase.

Generally when molding grade pellets are produced, either a batch or continuous process is used. In a batch process, pellets are added to a large container heated according to the two stage process described above. The container is continuously rotated to provide uniform heating of the pellets, and to prevent sticking of the pellets to the container walls during the initial crystallization. In a continuous process, the pellets first drop by gravity into a crystallizer unit, and then flow by gravity through a large heated container which builds the IV. Continuous processes are preferred for commercial operations for reasons of economics. Normally, in solid stating pellets in accordance with the present invention, particles of regular or irregular shape may be used. The particles may be of various shapes and sizes such as spherical, cubical, irregular, cylindrical, and shapes which are generally flat.

Solid stating in accordance with the present invention is accomplished by subjecting the copolyester particles to a temperature of about 140° C. to about 2° C., preferably about 100° C. to about 10° C., below the melting point of the copolyester. The time of solid stating can vary over a wide range (about 1 minute to 100 hours) according to temperature to obtain the desired I.V., but with the higher temperatures, usually about 10 hours to about 60 hours is sufficient to obtain the desired I.V. During this period of solid stating, it is conventional to flow a stream of inert gas through the pellets to aid in temperature control of the copolyester pellets and to carry away reaction gases such as ethylene glycol and acetaldehyde. Preferably, the inert gas is recycled for economic reasons. Inert gases which may be used include helium, argon, hydrogen, nitrogen and mixtures thereof. It should be understood that the inert gas may contain some air.

It is often observed during solid stating polymerization processing that the rate of inherent viscosity increase may slow with time. Thus, the maximum IV that can be obtained may be limited by the initial IV of the precursor material. For this reason, the precursor I.V. for the copolyesters described in this invention should be between 0.4 and 0.9 dL/g, preferably between 0.6 and 0.85 dL/g, most preferably between 0.65 and 0.8 dL/g.

These compositions can be extrusion blow molded using conventional equipment known to those skilled in the art such as continuous, reciprocating screw and accumulator head extrusion blow molding equipment. Copolyesters that possess crystallization halftimes, measured at 170° C., of less than 2 minute will fully or partially crystallize during cooling in the mold, resulting in undesirable whiteness in the final part.

In accordance with another aspect of the present invention, the copolyester of the present invention can be blow molded into various articles and containers, such as for example, food containers, personal care containers, medical devices and containers, industrial containers, as well as blow molded parts for appliances, cabinetry and automotive applications. Accordingly, the blow molded article is composed of at least 50 weight %, more preferably at least 75 weight % and most preferably at least about 95 weight % of the copolyester composition described in detail above.

The following terms and ranges useful in understanding the examples of the invention are defined below.

Processability was determined using a 80 mm Bekum H-121 continuous extrusion blow molding machine fitted with either a barrier screw or a mixing screw containing both cavity transfer and Maddock mixing sections. The extruder was run at 6 rpm. The materials were extruded into 340 milliliter (ml) Boston Round Bottles. The bottles weighed between 25 and 30 grams. As defined herein, the "minimum processing temperature" is the lowest temperature at which a parison could be extruded without observation of gels or crystallization in the side walls or at the pinch point. It is possible that even at this minimum processing temperature the parison would lack sufficient melt strength to successfully blow a bottle. "Successfully blowing a bottle" is defined as blowing a bottle into the desired shape with uniform side wall thickness and without the formation of holes.

Toughness was measured by filling a successfully blown Boston Round bottles with water, storing them overnight, capping them and then dropping them from a series of heights of from about 2 feet to about 11 feet in accordance with ASTM D2463. The 50% drop height was determined in accordance with ASTM D2463 using procedure B, the Bruceton Staircase method. Boston Round bottles (340 ml) made from the copolyesters of the present invention have drop heights greater than 9 feet.

Transparency as defined by the present invention is measured according to ASTM Method D1003. It is preferable that molded objects prepared from the copolyester of the invention have a diffuse transmittance value of less than about 60%, more preferably, less than about 40%, and more preferably, less than about 20%. When the diffuse transmittance value is less than about 60%, the molded objects are visually clear.

Crystallization half times from the glass state, as defined by the present invention, are measured using a Perkin-Elmer Model DSC-2 differential scanning calorimeter. A sample of 15.0 mg was sealed in an aluminum pan and heated to 290° C. at a rate of about 320° C./minute and held for 2 minutes to uniformly melt the material. The sample is then cooled to below its glass transition temperature at a rate of about 320° C./minute to generate an amorphous specimen. The specimen was then reheated at 320° C./minute immediately to the predetermined isothermal crystallization temperature in the presence of helium. The crystallization half time was determined as the time span from reaching the isothermal crystallization temperature to the point of a crystallization peak on the DSC curve. Crystallization halftimes from the glass transition temperature in this invention are measured on the precursor pellets. This provides an indication of the ability of the precursor pellets to be crystallized in commercial solid stating equipment. Half times of less than 10 minutes indicate that the material can be crystallized in a solid stating process. These halftimes also correlate with halftimes measured on the final extrusion blow molding parison. The parison half times provide an indication of whether the parison will crystallize during processing. Half times of greater than 2 minutes indicate that the parison can be processed in an extrusion blow molding process to produce amorphous bottles. For forming satisfactory blow molded articles, the copolyesters of the present invention must have crystallization half times from the glass state of about 2 minutes to about 10 minutes.

Melt viscosities were measured in accordance with ASTM D4440. A frequency scan of between 1 rad/sec and 400 rad/sec was employed. The melt viscosity at 1 rad/sec is correlated to the "melt strength" of the polymer. Preferred copolyesters of the invention must have a melt viscosity at the "minimum processing temperature" of at least 30,000 poise.

Inherent viscosities (I.V., dL/g) as defined by the present invention are measured at 25° C. using 0.5 g polymer per 100 mL of a solvent consisting of 60 parts by weight phenol and 40 parts by weight tetrachloroethane. Copolyesters of the present invention should have inherent viscosity (I.V.) values of about 0.9 to about 1.3 dL/g.

Melt temperatures were determined using differential scanning calorimetry in accordance with ASTM D3418. A sample of 15.0 mg was sealed in an aluminum pan and heated to 290° C. at a rate of 20° C./minute. The sample was then cooled to below its glass transition temperature at a rate of about 320° C./minute to generate an amorphous specimen. The melt temperature, Tm, corresponds to the peak of the endotherm observed during the scan. Note that some copolyesters do not exhibit a melt temperature as defined by this method. The melt temperature of a copolyester helps define the "minimum processing temperature" of the copolyester. Preferred copolyesters should have melt temperatures ($T_m$) of between about 240° C. to 275° C. as determined by Differential Scanning Calorimetry (DSC) (ASTM D3418) at a scan rate of 20° C./min.

The present invention is illustrated in greater detail by the specific examples presented below. It is to be understood that these examples are illustrative embodiments and are not intended to be limiting of the invention, but rather are to be construed broadly within the scope and content of the appended claims.

Comparative Example 1

An extrusion blow molded Boston Round bottle was prepared from a copolyester having an I.V. of 0.74 dL/g composed of 100 mole % terephthalic acid, 69 mole % ethylene glycol and 31 mole % 1,4-cyclohexanedimethanol. The crystallization half time from the glass state of the precursor pellets was greater than 10 minutes. The pellets did not show a melt temperature as measured by DSC. The parison was extruded at a melt temperature of 220° C. At this temperature, the melt viscosity of the copolyester pellets was 33,000 poise. The bottles produced were transparent. These bottles possessed a drop height of 7 feet. With a crystallization halftime greater than 10 minutes, this material could not be solid stated due to cohesion of the pellets.

Comparative Example 2

An extrusion blow molded Boston Round bottle was prepared from a copolyester that had been solid stated to an I.V. of 0.98 dL/g composed of 100 mole % terephthalic acid, 97 mole % ethylene glycol and 3 mole % 1,4-cyclohexanedimethanol. The crystallization half time from the glass state of the precursor pellets was 3.7 minutes. The precursor pellets have a melt temperature of 253° C. as measured by DSC. The parison was extruded at a processing melt temperature of 265° C. At this temperature, the melt viscosity of the copolyester pellets was 72,000 poise. The bottles produced were transparent. These bottles possessed a drop height of 7 feet.

Comparative Example 3

A copolyester having an I.V. of 0.80 dL/g composed of 100 mole % 1,4-cyclohexanedimethanol, 83 mole % terephthalic acid and 17 mole % isophthalic acid was prepared. The crystallization half time from the glass state of the precursor pellets was 1.1 minutes. The precursor pellets had a melt temperature of 262° C. as measured by DSC. The polymer was extruded at a processing melt temperature of 270° C. and had insufficient melt strength at 270° C. to form a satisfactory parison for testing. At 270° C., the melt viscosity of the copolyester pellets is 15,000 poise. Bottles could not be fabricated for drop testing due to the low melt strength.

Comparative Example 4

An extrusion blow molded Boston Round bottle was prepared from a copolyester that had been solid stated for 12 hours at 244° C. to an I.V. of 1.02 dL/g composed of 100 mole % 1,4-cyclohexanedimethanol, 83 mole % terephthalic acid and 17 mole % isophthalic acid. The crystallization half time from the glass state of the precursor pellets was 1.1 minutes. The precursor pellets had a melt temperature of 262° C. as measured by DSC. The parison was extruded at a processing melt temperature of 280° C. At this temperature, the melt viscosity of the copolyester pellets was 34,000 poise. The bottles produced at this temperature were crystalline at the pinch point and contained many unmelts. Attempts to process at higher temperatures resulted in a loss of melt strength. Good bottles could not be fabricated for drop testing due to crystallization at the pinch point.

Comparative Example 5

A copolyester was prepared having an I.V. of 0.72 dL/g composed of 100 mole % 1,4-cyclohexanedimethanol, 65 mole % terephthalic acid and 35 mole % isophthalic acid. The crystallization half time from the glass state of the precursor pellets was greater than 10 minutes. With a crystallization halftime greater than 10 minutes, this material could not be solid stated. The precursor pellets had a melt temperature of 225° C. as measured by DSC. The polymer had insufficient melt strength at a processing melt temperature of 240° C., and crystallized at lower processing temperatures. At 240° C., the melt viscosity of the copolyester pellets was 20,000 poise. Bottles could not be fabricated for drop testing due to the low melt strength.

Comparative Example 6

A copolyester was prepared having an I.V. of 0.72 dL/g composed of 100 mole % terephthalic acid, 38 mole % ethylene glycol and 62 mole % 1,4-cyclohexanedimethanol. The crystallization half time from the glass state of the precursor pellets was greater than 10 minutes. With a crystallization halftime greater than 10 minutes, this material could not be solid stated due to cohesion of the pellets. The precursor pellets have a melt temperature of 240° C. as measured by DSC. The polymer had insufficient melt strength at a processing melt temperature of 250° C. to form a satisfactory parison and crystallized at lower processing temperatures. At 250° C., the melt viscosity of the copolyester pellets was 12,000 poise. Bottles could not be fabricated for drop testing due to the low melt strength.

Comparative Example 7

A copolyester was prepared having an I.V. of 0.72 dL/g composed of 100 mole % 1,4-cyclohexanedimethanol, 74 mole % terephthalic acid and 26 mole % isophthalic acid. The crystallization half time from the glass state of the precursor pellets was 5.5 minutes. The precursor pellets have a melt temperature of 243° C. as measured by DSC. The polymer had insufficient melt strength at a processing melt temperature of 250° C. to form a satisfactory parison, and crystallized at lower processing temperatures. At 250° C., the melt viscosity of the copolyester pellets is 10,000 poise. Bottles could not be fabricated for drop testing due to the low melt strength.

Comparative Example 8

A copolyester was prepared having an I.V. of 0.72 dL/g composed of 100 mole % terephthalic acid, 81 mole % 1,4-cyclohexanedimethanol and 19 mole % ethylene glycol. The crystallization half time from the glass state of the precursor pellets was 3.1 minutes. The precursor pellets had a melt temperature of 250° C. as measured by DSC. The polymer had insufficient melt strength at a processing melt temperature of 260° C. to form a satisfactory parison, and crystallized at lower processing temperatures. At 260° C., the melt viscosity of the copolyester pellets was 10,000 poise. Bottles could not be fabricated for drop testing due to the low melt strength.

EXAMPLE 1

An extrusion blow molded Boston Round bottle was prepared in accordance with the present invention from a copolyester that had been solid stated for 28 hours at 215° C. to an I.V. of 1.07 dL/g. The copolyester was composed of 100 mole % 1,4-cyclohexanedimethanol, 74 mole % terephthalic acid and 26 mole % isophthalic acid. The half time from the glass state of the precursor pellets was 5.5 minutes. The precursor pellets had a melt temperature of 243° C. as measured by DSC. The parison was extruded at a processing melt temperature of 260° C. At this temperature, the melt viscosity of the copolyester pellets was 86,000 poise. The bottles produced were transparent. These bottles possessed a drop height of 11 feet.

EXAMPLE 2

An extrusion blow molded Boston Round bottle was prepared in accordance with the present invention from a copolyester that had been solid stated for 24 hours at 215° C. to an I.V. of 1.03 dL/g. The copolyester was composed of 100 mole % terephthalic acid, 81 mole % 1,4-cyclohexanedimethanol and 19 mole % ethylene glycol. The crystallization half time from the glass state of the precursor pellets was 3.1 minutes. The precursor pellets had a melt temperature of 250° C. as measured by DSC. The parison was extruded at a processing melt temperature of 260° C. At this temperature, the melt viscosity of the copolyester pellets was 79,000 poise. The bottles produced were transparent. These bottles possessed a drop height of 11 feet.

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents. Moreover, all patents, patent applications, publications, and literature references presented herein are incorporated by reference in their entirety for any disclosure pertinent to the practice of this invention.

What is claimed is:

1. A copolyester comprising at least about 70 mole % terephthalic acid and at least about 70 mole % 1,4-cyclohexanedimethanol wherein the mole percentages of the acid component total 100 mole % and the mole percentages of the glycol component total 100 mole %;

wherein said copolyester has a inherent viscosity greater than about 0.9 dL/g and is prepared by a process comprising solid-state polymerizing a copolyester having a starting inherent viscosity of from about 0.4 to about 0.8 dL/g for a period of from about 1 minute to 100 hours and at a temperature of from about 140° C. to about 2° C. below the melting point of said copolyester to increase the inherent viscosity to greater than about 0.9 dL/g, and wherein resulting copolyester has a crystallization half time from the glass state as measured by DSC of from about 2 to about 10 minutes, as measured at 170° C.

2. The copolyester of claim 1 wherein said copolyester has a starting inherent viscosity of from about 0.6 to about 0.80 dL/g and said solid-state processing is performed at a temperature of from about 100° C. to about 10° C. below the melting point of said copolyester.

3. The copolyester of claim 1 wherein said diacid further includes from 0 to about 30 mole % of an additional diacid selected from the group consisting of isophthalic acid, cyclohexanedicarboxylic acid, naphthalenedicarboxylic acid, diphenyldicarboxylic acid, stilbenedicarboxylic acid and mixtures thereof.

4. The copolyester of claim 3 comprising from about 20 to about 30 mole % isophthalic acid and 100 mole % 1,4-cyclohexanedimethanol.

5. The copolyester of claim 1 wherein said diol further includes from 0 to about 30 mole % of a second diol selected from the group consisting of ethylene glycol, diethylene glycol, triethylene glycol, propanediol, butanediol, pentanediol, hexanediol, tetramethylcyclobutanediol, and mixtures thereof.

6. The copolyester of claim 5 wherein said copolyester includes 100 mole % terephthalic acid, from about 10 to about 23 mole % ethylene glycol and the remainder 1,4-cyclohexanedimethanol.

7. The copolyester of claim 5 wherein said copolyester includes 100 mole % terephthalic acid, from about 15 to about 20 mole % ethylene glycol and the remainder 1,4-cyclohexanedimethanol.

8. An extrusion blow molded article comprising at least about 50 weight % of a PCT copolyester composition comprising:

at least about 70 mole % terephthalic acid and at least about 70 mole % 1,4-cyclohexanedimethanol wherein the mole percentages of the acid component total 100 mole % and the mole percentages of the glycol component total 100 mole %; wherein said copolyester has a starting inherent viscosity of from about 0.4 to about 0.8 dL/g; and wherein said polyester is solid state polymerized from about 1 minute to about 100 hours at a temperature of from about 140° C. to about 2° C. below the melting point of said polyester so that the inherent viscosity is increased to greater than 0.9 dL/g, and wherein resulting copolyester has a crystallization half time from the glass state as measured by DSC of from about 2 to about 10 minutes, as measured at 170° C.

9. The extrusion blow molded article of claim 8 wherein said copolyester has an inherent viscosity of from about 0.6 to about 0.80 dL/g and said solid-state processing is performed at a temperature of from about 100° C. to about 10° C. below the melting point of said copolyester.

10. The extrusion blow molded article of claim 8 further having a semi-crystalline melting point of from about 240° C. and 270° C., as measured by a DSC heating scan.

11. The extrusion blow molded article of claim 8 wherein the diacid of said copolyester further includes from 0 to about 30 mole % of an additional diacid selected from the group consisting of isophthalic acid, cyclohexanedicarboxylic acid, naphthalenedicarboxylic acid, diphenyldicarboxylic acid, stilbenedicarboxylic acid and mixtures thereof.

12. The extrusion blow molded article of claim 11 wherein said copolyester includes from about 20 to about 30 mole % isophthalic acid and 100 mole % 1,4-cyclohexanedimethanol.

13. The extrusion blow molded article of claim 8 wherein the diol of said copolyester further includes from 0 to about 30 mole % of a second diol selected from the group consisting of ethylene glycol, diethylene glycol, triethylene glycol, propanediol, butanediol, pentanediol, hexanediol, tetramethylcyclobutanediol, and mixtures thereof.

14. The extrusion blow molded article of claim 8 is composed of a copolyester comprising 100 mole % terephthalic acid, from about 10 to about 23 mole % ethylene glycol and the remainder 1,4-cyclohexanedimethanol.

15. The extrusion blow molded article of claim 8 is composed of a copolyester comprising 100 mole % terephthalic acid, from about 15 to about 20 mole % ethylene glycol and the remainder 1,4-cyclohexanedimethanol.

16. The extrusion blow molded article of claim 8 wherein said copolyester has an inherent viscosity of from about 0.95 to about 1.10 dL/g after solid stating.

17. The extrusion blow molded article of claim 8 having at least about 75 weight % of said copolyester.

18. The extrusion blow molded article of claim 8 having at least about 95 weight % of said copolyester.

19. The extrusion blow molded article of claim 8 wherein said article is selected from the group consisting of food containers, personal care containers, medical containers, industrial containers, appliance parts and cabinetry.

* * * * *